(12) United States Patent
Allen et al.

(10) Patent No.: US 8,353,410 B2
(45) Date of Patent: Jan. 15, 2013

(54) POLYMERIC FILMS MADE FROM POLYHEDRAL OLIGOMERIC SILSESQUIOXANE (POSS) AND A HYDROPHILIC COMONOMER

(75) Inventors: Robert David Allen, San Jose, CA (US); Young-Hye Na, San Jose, CA (US); Ratnam Sooriyakumaran, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 12/624,605

(22) Filed: Nov. 24, 2009

(65) Prior Publication Data
US 2011/0120940 A1   May 26, 2011

(51) Int. Cl.
| | |
|---|---|
| B01D 39/00 | (2006.01) |
| B01D 29/46 | (2006.01) |
| B01D 67/00 | (2006.01) |
| B01J 49/00 | (2006.01) |
| B29C 44/04 | (2006.01) |

(52) U.S. Cl. .............. 210/500.35; 210/500.25; 210/490; 521/27; 264/48

(58) Field of Classification Search .............. 210/500.27, 210/500.25, 490; 524/853; 521/30, 27; 429/29, 429/42, 33, 129; 264/48
See application file for complete search history.

(56) References Cited

U.S. PATENT DOCUMENTS

| | | | |
|---|---|---|---|
| 4,056,456 A | 11/1977 | Sano et al. | |
| 4,970,034 A | 11/1990 | Ly et al. | |
| 5,041,225 A | 8/1991 | Norman | |
| 5,510,394 A | 4/1996 | Hodgdon | |
| 5,512,205 A | 4/1996 | Lai | |
| 5,998,200 A | 12/1999 | Bonaventura et al. | |
| 6,083,393 A | 7/2000 | Wu et al. | |
| 6,313,219 B1 * | 11/2001 | Taylor-Smith | 524/853 |
| 6,551,536 B1 | 4/2003 | Kwak et al. | |
| 6,569,932 B2 | 5/2003 | Hsiao et al. | |
| 7,067,606 B2 | 6/2006 | Mather et al. | |
| 7,316,919 B2 | 1/2008 | Childs et al. | |
| 7,381,331 B2 | 6/2008 | Duong et al. | |
| 7,381,471 B2 | 6/2008 | Augustine et al. | |
| 7,563,828 B2 * | 7/2009 | Taylor-Smith | 521/30 |
| 7,572,872 B2 | 8/2009 | Flodin et al. | |

(Continued)

FOREIGN PATENT DOCUMENTS

AU     200157746 A1     2/2003

(Continued)

OTHER PUBLICATIONS

Fang Yao et al., "Antibacterial effect of surface-functionalized polypropylene hollow fiber membrane from surface-initiated atom transfer radical polymerization," *Journal of Membrane Science*, 319 (2008) 149-157.

(Continued)

*Primary Examiner* — Ana Fortuna
(74) *Attorney, Agent, or Firm* — Shumaker & Sieffert, P.A.

(57) ABSTRACT

A composite membrane includes a filtration membrane and a layer on a surface of the filtration membrane. The layer includes a polymer including a polyhedral oligomeric silsesquioxane (POSS) derivative with a hydrophilic moiety attached to at least one vertex thereof. A method for making a composite membrane includes applying to a surface of a filtration membrane a photopolymerizable composition including a POSS compound, a hydrophilic comonomer, and a photoinitiator. The composition is cured to form a hydrophilic layer on the filtration membrane.

19 Claims, 7 Drawing Sheets

U.S. PATENT DOCUMENTS

| | | | |
|---|---|---|---|
| 7,604,746 B2 | 10/2009 | Childs et al. | |
| 2006/0194096 A1* | 8/2006 | Valle et al. | 429/42 |
| 2007/0238317 A1 | 10/2007 | Allen et al. | |
| 2008/0160104 A1 | 7/2008 | Ramesh et al. | |
| 2008/0214694 A1 | 9/2008 | Yokota et al. | |
| 2011/0017662 A1* | 1/2011 | Okabe et al. | 210/500.27 |

FOREIGN PATENT DOCUMENTS

| | | |
|---|---|---|
| CN | 1401417 A | 3/2003 |
| EP | 1 283 068 A1 | 2/2003 |
| FR | 2 843 045 A1 | 2/2004 |
| GB | 2 390 042 A | 12/2003 |
| JP | 2003-053163 | 2/2003 |
| JP | 2004-025102 | 1/2004 |
| WO | WO 2007/052260 A2 | 5/2007 |

OTHER PUBLICATIONS

Heru Susanto et al., "High-performance thin-layer hydrogel composite membranes for ultrafiltration of natural organic matter," *Water Research*, 42 (2008) 2827-2835.

T. Carroll et al., "Polyelectrolyte-grafted microfiltration membranes to control fouling by natural organic matter in drinking water," *Journal of Membrane Science*, 203 (2002) 3-13.

Jian Zhang et al., "Water Absorbency of Poly(sodium acrylate) Superabsorbents Crosslinked with Modified Poly(ethylene glycol)s," *Journal of Applied Polymer Science*, vol. 90, 1851-1856 (2003).

Hao Ju et al., "Crosslinked poly(ethylene oxide) fouling resistant coating materials for oil/water separation," *Journal of Membrane Science*, 307 (2008) 260-267.

D.E. Potts et al., "A Critical Review of Fouling of Reverse Osmosis Membranes," *Desalination*, 36 (1981) 235-264.

Jian Wu et al., "Crystallization of POSS in a PEG-Based Multiblock Polyurethane: Toward a Hybrid Hydrogel," *Mater. Res. Soc. Symp. Proc.*, vol. 847 (2005) 6 pages.

Marina Galia et al., "Monodisperse Polymer Beads as Packing Material for High-Performance Liquid Chromatography: Effect of Divinylbenzene Content on the Porous and Chromatographic Properties of Poly(styrene-co-divinylbenzene) Beads Prepared in Presence of Linear Polystyrene as a Porogen," *Journal of Polymer Science: Part A: Polymer Chemistry*, vol. 32, 2169-2175 (1994).

Timothy S. Haddad et al., "Nanostructured Hybrid Organic/Inorganic Materials, Silsesquioxane Modified Plastics," *Polymer Preprints*, vol. 40, No. 1 (2001) 2 pages.

"Hybrid Plastics™ POSS® Chemical Catalog" 2009 v. 1.01 (39 pages).

Woojin Lee et al., "Telechelic Poly(ethylene glycol)-POSS Amphiphiles at the Air/Water Interface," *Macromolecules*, 2007, 40, 682-688.

Irada S. Isayeva et al., "Amphiphilic Membranes Crosslinked and Reinforced by POSS*," *Journal of Polymer Science: Part A: Polymer Chemistry*, vol. 42, 4337-4352 (2004).

U.S. Appl. No. 12/624,633, filed Nov. 24, 2009 entitled "Composite Membranes With Performance Enhancing Layers".

* cited by examiner

FIG. 1C
60% PEG addition

FIG. 1B
30% PEG addition

FIG. 1A
0% PEG addition

POLYMERIC FILMS MADE FROM POLYHEDRAL OLIGOMERIC SILSESQUIOXANE (POSS) AND A HYDROPHILIC COMONOMER

TECHNICAL FIELD

The present disclosure relates to polymeric films made with polyhedral oligomeric silsesquioxane (POSS) compounds and a hydrophilic comonomer. The films may be used in, for example, filtration applications, or applied on another membrane to form a performance enhancing layer thereon.

BACKGROUND

Membrane technologies such as microfiltration (MF), ultrafiltration (UF), nanofilitration (NF), and reverse osmosis (RO) have been widely used for water purification because they are energy efficient, cost-effective and simple to operate. However, many commercial membranes experience substantial flux declines when they are exposed to contaminants such as, for example, inorganic salts, emulsified oil droplets, and natural organic matter. These contaminants in the water can deposit on the membrane surface and/or block the pores of the membrane, which foul the membrane and decrease its useful life.

Current approaches to address this fouling problem include pretreatment of the feed water, periodic depressurization of the membrane tube, flow reversal, and use of cleaning agents to remove fouled films from membrane surface. These techniques require energy and/or additional chemicals, and reduce productive membrane operating time, which directly contributes to increased operating costs.

Modifying a surface of the membrane with a fouling-resistant material is another approach that can potentially increase the useful life of the membrane and reduce operating costs. Materials such as, for example, nanoparticles, enzymes, and epoxy compounds, have demonstrated some fouling resistance, but there is still a need to develop highly water-permeable, anti-fouling materials that retain high water flux through the membrane over an extended membrane operating time.

SUMMARY

In general, the present invention relates to thin films crosslinked with a polyhedral oligomeric silsesquioxane (POSS) compound. The POSS compounds, which have a cage-like structure, can include a wide variety of linking groups and/or functional groups at their vertices (depending on cage structure). These linking groups can be used to polymerize the POSS compounds with a wide variety of comonomers.

In one embodiment, a POSS compound is reacted with a hydrophilic comonomer to form a hydrophilic performance enhancing layer that may be applied to or formed on a surface of a filtration membrane. In one embodiment, the layer includes a polymer including a polyhedral oligomeric silsesquioxane (POSS) derivative with a hydrophilic moiety attached to at least one vertex thereof.

The water uptake and permeability of this layer can be controlled by manipulating the composition ratio between the POSS compound and the hydrophilic comonomers. The structure of the performance enhancing layer can optionally include additional nano-channels and/or pores to improve, for example, its water uptake and permeability. The performance enhancing layer is highly water-permeable, and in some embodiments provides a composite membrane structure that resists fouling caused by organic or biological compounds. The composite membranes including such coatings retain high water flux for an extended operating time.

In yet another embodiment, the invention relates to a method for making a thin film layer on a surface of a filtration membrane. The method includes curing a composition including a POSS compound, a hydrophilic comonomer, and a solvent-extractable sacrificial compound to form a layer on the membrane. In some embodiments, a solvent is applied to the thin film to extract the sacrificial compound and create at least one of pores and channels in the layer.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 2($a$) is a schematic drawing of the cross-sectional structure of a composite membrane.

FIG. 2($b$) is a plot of permeate flux vs. time for oil/water emulsion cross-flow filtration tests of coated and uncoated polysulfone (PSF) membranes.

FIG. 3($a$) is a cross-sectional SEM image of a composite membrane coated by a neat pre-polymerization mixture (POSS-PEG-M A50N).

FIG. 3($b$) is a cross-sectional SEM image of a composite membrane coated by a dilute pre-polymerization mixture (POSS-PEG-M A50D, diluted by 20% (w/w) EtOH).

FIG. 4($a$) is a plot of permeate flux vs. time in cross-flow filtration of protein feed solution with coated and uncoated PSF membranes.

FIG. 4($b$) is a plot of the flux recovery index of uncoated PSF, POSS-PEG-M A50N coated, and POSS-PEG-M A50D coated membranes. $P_{w,o}$=pure water permeance measured before the fouling experiment, $P_{w,f}$=pure water permeance measured after the fouling experiment.

DETAILED DESCRIPTION

In one aspect, the present invention relates to thin films formed by polymerizing (curing) a composition that includes a polyhedral oligomeric silsesquioxane (POSS) compound and a suitable hydrophilic comonomer. POSS compounds, which have a cage-like structure, can be synthesized to include a wide variety of linking groups and/or functional groups at their cage vertices, and function as highly effective crosslinkers. The linking and/or functional groups on the POSS compounds can include reactive functionality suitable for polymerization or grafting POSS monomers to polymer chains, as well as nonreactive functionality to link to a functional group and/or enhance, for example, solubility and compatibility of the POSS compounds with a particular polymer system. The linking and/or functional groups can be used to polymerize the POSS compounds with a wide variety of comonomers.

In the present application, the term POSS compound refers to resins having the structures (I), (II), (III) or (IV) where:

(I)

is denoted by the formula $T_8^R$, where T represents $R\,SiO_{3/2}$;

(II)

is denoted by the formula $T_{10}^R$, where T represents $R\,SiO_{3/2}$;

(III)

is denoted by the formula $T_{12}^R$, where T represents $R\,SiO_{3/2}$; and (IV)

In formulae (I)-(IV) above, one or more R groups are independently selected from polymerizable groups such as, for example:

(1) methacrylates including (V)A

; and (V)B

; and (Methacryl POSS)

(2) acrylates including (V)C

;

(V)D

.

(Acryl POSS)

Alternatively, the polymerizable R groups may include the structure $-(L)_n-P$, where L is a linking group, n is 0 or 1, and P is a polymerizable moiety, wherein each linking group is independently selected from alkyl groups, cycloalkyl groups, siloxanes, alkylsilyl groups, and alkyl-siloxyl groups.

The substituted POSS compounds may be denoted by the general formulas $T_m^R$ where m is equal to 8, 10 or 12. When m=8 a common name of the compound is octakis(N) silsesquioxane, where N is the name of the indicates the R group.

Structure (IV) may be considered exemplary of an open cage substituted POSS oligomer of a first type where each silicon atom of the cage is bound to the proper number of oxygen atoms (three in structure IV) but some of the oxygen atoms are not bound to two silicon atoms (the two —OH groups in structure IV).

Structures (VI) and (VII) illustrated infra, are examples of a second type of open cage POSS structure where one or more silicon atoms of the cage are not present, but every silicon atom of the cage is still bound to the proper number of oxygen atoms:

(VI)

where R1=an ethyl group and R2=structure (V)E; and (VII)

where R$_3$=an isobutyl group and R$_4$=structure (V)A.

Structures (I), (II) and (III) are closed cage substituted POSS compounds. Structure (IV) is an open cage substituted T$_8$ POSS compound with two of the —Si—O—Si— cage bridges opened. Structures (VI) and (VII) are open cage substituted T$_8$ POSS compounds with one cage Si atom not present. The substituted POSS compounds may include open cage T$_8$, T$_{10}$ and T$_{12}$ structures having one or more open —Si—O—Si—O— bridges open or one or more cage Si atoms not present.

In some embodiments, the formulations used to make the inventive thin films may include mixtures of T$_8^R$ POSS compounds with different R groups, mixtures of T$_{10}^R$ POSS compounds with different R groups, and/or mixtures of T$_{12}^R$ POSS compounds with different R groups. In some embodiments, the compositions of the present invention may include mixtures of open and closed cage T$_8^R$, T$_{10}^R$ and T$_{12}^R$ POSS compounds.

The R groups on the POSS compounds may be the same or different, and may be independently selected from polymerizable or non-polymerizable groups such, for example, linear alkyl, branched alkyl, cycloalkyl, fluorinated linear alkyl, fluorinated branched alkyl, fluorinated cycloalkyl, cycloalkyl substituted alkyl, alkyl substituted cycloalkyl having a heteroalkyl group, heterocycloalkyl, aralkyl where the alkyl groups are linear, branched or cyclic, alkaryl where the alkyl groups are linear, branched or cyclic, phenyl, substituted phenyl, phenanthryl, substituted phenanthryl, aryl, substituted aryl, naphthyl, substituted naphthyl, polynuclear aromatic groups with two or more fused rings, substituted polynuclear aromatic groups with two or more fused rings, aromatic groups, and substituted aromatic.

Particularly preferred POSS compounds include methacryl POSS ((C$_7$H$_{11}$O$_2$)$_n$(SiO$_{1.5}$)$_n$ with n=8, 10, or 12), acryloPOSS ((C$_6$H$_9$O$_2$)$_n$(SiO$_{1.5}$)$_n$ with n=8, 10, or 12), and other functionalized (meth)acryl POSS compounds such as, for example, acryloisobutyl POSS, methacrylisobutyl POSS, methacrylethyl POSS, methacrylisooctyl POSS, and methacrylphenyl POSS. Suitable POSS compounds are available from Hybrid Plastics Co., Hattiesburg, Miss.

The amount of the POSS compound in the film-forming composition is preferably about 1% by weight to about 30% by weight, more preferably 3% to 15%, and even more preferably about 3% to 7% by weight.

The POSS compounds may be polymerized with a wide variety of hydrophilic comonomers. Suitable comonomers include ethylenically unsaturated compounds selected from monomers, oligomers, polymers, or mixtures thereof, and may be used in various combinations to modify the properties of the film-forming composition, such as, for example, viscosity, cure rate, wetting and adhesion.

Preferred ethylenically unsaturated compounds include (meth)acrylate functionality (wherein "(meth)acrylate" refers to an acrylate and a methacrylate). The film-forming compositions of this disclosure preferably include one or more (meth)acryl functional monomers, oligomers or polymers, which may optionally be multifunctional. The (meth)acrylate functional groups of the (meth)acrylate comonomers are bonded to a core structural group, which may be based on a wide variety of organic structures including tripropylene glycol, isobornyl alcohol, isodecyl alcohol, phenoxyethyl alcohol, trishydroxyethyl isocyanurate, trimethylolpropane ethoxylate, hexanediol, ethoxylated and propoxylated neopentyl glycol, oxyethylated phenol, polyethylene glycol, bisphenol ethoxylate, neopentyl glycol propoxylate, trimethylolpropane, propoxylated glycerol, di-trimethylolpropane, pentaerythritol, tetrahydrofurfuryl alcohol, beta-carboxyethyl alcohol, substituted derivatives of the above, combinations of the above, and the like.

Examples of suitable functional acrylic functional comonomers include poly(ethylene glycol)acrylate, poly(ethylene glycol)diacrylate, poly(ethylene glycol)methacrylate, acrylic acid, 2-hydroxyethyl methacrylate, 2-hydroxyethyl acrylate, 2-(2-ethoxyethoxy)ethyl acrylate, tetrahydrofurfuryl acrylate, and the like.

Single or multi-functional polyethylene glycol (PEG) (meth)acrylates have been found to have many beneficial properties in the film forming compositions. The molecular weight (M$_w$) of the PEG (meth)acrylates can be varied to control the water uptake of the polymerized thin film reaction product of the POSS compound and the comonomer. In some embodiments, the Mw of PEG-M is preferably about 150 to 2000, more preferably 200 to 1000, and even more preferably about 500 to 600.

The amount of the comonomer in the film-forming composition is preferably about 70% by weight to about 99% by weight, more preferably 85% to 97% by weight, and even more preferably 93% to 97% by weight.

To control the water uptake of the thin film reaction product of the POSS compound and the comonomer, the ratio by weight in the film-forming composition between the POSS compound and the comonomer can be varied over a wide range. Suitable ratios by weight between the POSS compound and the comonomer are from about 1:1 to about 1:30, preferably about 1:5 to 1:20, and more preferably about 1:20.

The film-forming composition is preferably radiation curable, and may be cured via visible light, electron beam, thermal initiation, or cationic initiation. In a preferred embodiment, the film-forming compositions are ultraviolet ("UV") radiation-curable, and include a POSS compound, a hydrophilic comonomer, and a photoinitiator. The photoinitiator is typically present in an amount of about 0.1 wt % to about 10 wt %, based on the total weight of the film-forming composition.

Among photoinitiators suitable for use in the present invention with functional comonomers having (meth)acrylate functional groups are alpha-cleavage type photoinitiators and hydrogen abstraction-type photoinitiators. The photoinitiator may include other agents such as coinitiators or photoinitiator synergists that aid the photochemical initiation reaction. Suitable cleavage type photoinitiators include alpha, alpha-diethoxyacetophenone (DEAP), dimethoxyphenylacetophenone (commercially available under the trade designation IRGACURE 651 from Ciba Corp., Ardsley, N.Y.), hydroxycyclo-hexylphenylketone (commercially available under the trade designation IRGACURE 184 from Ciba Corp.), 2-hydroxy-2-methyl-1-phenylpropan-1-one (commercially available under the trade designation DAROCUR 1173 from Ciba Corp.), a 25:75 blend of bis-(2,6-dimethoxybenzoyl)-2,4,4-trimethylpentyl phosphine oxide and 2-hydroxy-2-methyl-1-phenylpropan-1-one (commercially available under the trade designation IRGACURE 1700 from Ciba Corp.), a 50:50 blend of 2-hydroxy-2-methyl-1-phenylpropan-1-one and 2,4,6-trimethylbenzoyl-diphenylphosphine oxide (TPO, commercially available under the trade designation DAROCUR 4265 from Ciba Corp.), phosphine oxide, 2,4,6-trimethyl benzoyl (commercially available under the trade name IRGACURE 819 and IRGACURE 819DW from Ciba Corp.), 2,4,6-trimethylbenzoyl-diphenylphosphine oxide (commercially available under the trade designation LUCIRIN from BASF Corp., Mount Olive, N.J.), and a mixture of 70% oligo 2-hydroxy-2-methyl-4-(1-methylvinyl)phenylpropan-1-one and 30% 2-hydroxy-2-methyl-1-phenylpropan-1-one) (commercially available under the trade designation KIP 100 from Sartomer, Exton, Pa.), and aromatic ketones such as the compounds available under the trade designation TINOCURE from Ciba Corp. Suitable hydrogen abstraction-type photoinitiators include benzophenone, substituted benzophenones (such as that commercially available under the trade designation ESCACURE TZT from Fratelli-Lamberti, sold by Sartomer, Exton, Pa.), and other diaryl ketones such as xanthones, thioxanthones, Michler's ketone, benzil, quinones, and substituted derivatives of all of the above. Preferred photoinitiators include DAROCUR 1173, KIP 100, benzophenone, IRGACURE 184 and TINOCURE.

Preferred photoinitiators include benzophenone, 4-methylbenzophenone, benzoyl benzoate, phenylacetophenones, 2,2-dimethoxy-2-phenylacetophenone, alpha,alpha-diethoxyacetophenone, hydroxycyclo-hexylphenylketone, 2-hydroxy-2-methyl-1-phenylpropan-1-one, bis-(2,6-dimethoxybenzoyl)-2,4,4-trimethylpentyl phosphine oxide, 2-hydroxy-2-methyl-1-phenylpropan-1-one, 2-hydroxy-2-methyl-1-phenylpropan-1-one, 2,4,6-trimethylbenzoyl-diphenylphosphine oxide, and combinations thereof.

In some embodiments, the film forming composition may optionally include low viscosity polymerizable monomer diluents and/or a solvent. One purpose for including a low viscosity polymerizable monomer and/or a solvent is to reduce the viscosity of the composition. Suitable low viscosity polymerizable monomer diluents include, but are not limited to: mono- or di-functional methacrylates, including isobornyl methacrylate, glycidyl methacrylate, n-butyl methacrylate, methyl methacrylate and ethylene glycol dimethacrylate; methacrylate esters; mono- or di-functional acrylates including isobornyl acrylate, octyl acrylate, ethylene glycol diacrylate; vinyl ethers including butyl vinyl ether, ethylene glycol divinyl ether; and glycidyl ethers including ethylene glycol diglycidyl ether.

To control the thickness of the thin film, diluents that are miscible with all the components of the film forming composition may optionally be used. Preferred diluents include, but are not limited to: ethanol, mixtures of ethanol and water, or isopropanol.

To further improve the water transport properties of the polymerized thin film reaction product of the POSS compound and the selected comonomer, non-crosslinkable, solvent-extractable sacrificial compounds may optionally be included in the film-forming composition. While not wishing to be bound by any theory, following polymerization these solvent-extractable sacrificial compounds appear to be extracted by the solvent and rinse and/or migrate out of the cured thin film, which generates additional pores and/or nano-channeled structures in the cured thin films.

Suitable solvents for extracting the solvent-extractable compounds may vary widely depending on the type of sacrificial compound selected for use in the composition, and water is preferred. Suitable water-extractable non-crosslinking sacrificial additives include, but are not limited to, polyethylene glycol (PEG), polyacrylic acid, hydroxyethyl cellulose, or cyclodextrin derivatives.

The amount of the solvent-extractable sacrificial compounds may be added at up to 50% by weight of the film-forming composition. Preferred amounts of the solvent-extractable additives are about 10 wt % to about 50%, or about 20 wt % to about 50 wt %, or about 30 wt % to about 50 wt %, or about 40 wt % to about 50 wt %.

In one embodiment, the film forming composition may be applied to or formed on a major surface of a filtration membrane and cured to form a performance enhancing layer thereon. In one embodiment, for example, the performance enhancing layer includes a polymer including a polyhedral oligomeric silsesquioxane (POSS) derivative with a hydrophilic moiety attached to at least one vertex thereof. In a preferred embodiment, the polymer includes a polyhedral oligomeric silsesquioxane (POSS) derivative with a hydrophilic (meth)acryl moiety on at least one vertex thereof. In this embodiment, suitable (meth)acryl moieties are derived from, for example, poly(ethylene glycol)acrylate, poly(ethylene glycol)diacrylate, poly(ethylene glycol)methacrylate, acrylic acid, 2-hydroxyethyl methacrylate, 2-hydroxyethyl acrylate, 2-(2-ethoxyethoxy)ethyl acrylate, tetrahydrofurfuryl acrylate and the like. Moieties derived from poly(ethylene glycol) acrylate and poly(ethylene glycol)methacrylate are particularly preferred.

The solvent-extractable sacrificial compounds may optionally be used in the film forming composition to provide the cured thin film with pores and/or nanochannels of a desired size. In a preferred embodiment, the layer includes at least one of pores or channels with a molecular weight cutoff (the molecular weight of the reference polyethylene glycol that is 90% rejected by the membranes, referred to herein as the MWCO) of about 0.5 to about 10 kDa, or about 1 to about 8 kDa, or about 1.5 to about 7.5 kDa.

Any type of filtration membrane may be used as a substrate for the composite membrane structure that includes the filtration membrane and the performance enhancing layer, including, but not limited to: microfiltration (MF), ultrafiltration (UF), nanofiltration (NF) and reverse osmosis (RO) membranes.

Any of the membranes above can optionally be supported by a backing material such as, for example, a non-woven polyester fabric. In some embodiments, the backing material has a thickness of about 120 μm.

The film forming compositions can be applied to the membranes by a variety of methods including, for example, spraying, painting, rollcoating, brushing, fan coating, curtain coating, spreading, air knife coating, die-coating, vacuum coating, spin coating, electrodeposition, and dipping.

The thickness of the layer will vary with the application, and thinner coating layers can increase the water flux of the composite membrane. Typically, the layers will have a dry thickness of about 50 nm to about 5 μm, preferably about 50 nm to about 2 μm. However, thicker or thinner coatings are also contemplated depending on, for example, the desired water flux, water uptake, and rejection properties of the composite membrane.

The present invention also provides methods for coating that involve applying the film-forming composition to a substrate such as, for example, a filtration membrane, and allowing the coating composition to harden (e.g., preferably by exposing the coating composition to radiation such as UV light). Preferred coatings are cured by exposing the coating to radiation having a wavelength in the range of about 200 nm to about 800 nm. Preferred coatings, which are designed to be cured by ultraviolet or visible light, are preferably exposed to 200 mJ/cm$^2$ to 1000 mJ/cm$^2$ and more preferably exposed to 500 mJ/cm$^2$ to 800 mJ/cm$^2$ As shown in the examples below, the anti-fouling resistance of the composite membrane is significantly enhanced compared to that of the uncoated membrane.

The invention will now be further described with reference to the following non-limiting examples.

EXAMPLES

Preparation of Free-Standing Thin Films

As discussed in detail in the preparation examples below, free-standing thin films were made by reacting a POSS compound available from Hybrid Plastics Co., (meth)acryl substituted polyhedral oligomeric silsesquioxane (methacryl-POSS cage mixture $(C_7H_{11}O_2)_n(SiO_{1.5})_n$ with n=8, 10, 12, only n=8 is shown in scheme 1 below) and a hydrophilic comonomer, polyethylene glycol monoacrylate (PEG-M), available from Sigma-Aldrich Corp, St. Louis, Mo. The films were made with a UV curing process in the presence of a photo-initiator, TPO, commercially available under the trade designation DAROCUR 4265 from Ciba Corp. (BASF), Tarrytown, N.Y.

The compositional ratios by weight between POSS and PEG-M were controlled from 1:1 to 1:30. Pure water uptake of these free standing films was measured to characterize the water transport property of the films, and the water uptake was increased from 7% to 120% as the content of PEG-M increased (the water uptake value can be varied by changing the $M_w$ of PEG-M as well).

For further improvement in water transport property of the films, nano-channeled structures were generated by adding sacrificial additives. The density and size of nano-channels in the films can be tuned by controlling the amount of PEG additives. As a result, the film has higher channel density and/or size shows better water transport property (e.g., water uptake and permeability).

Figure 1A:
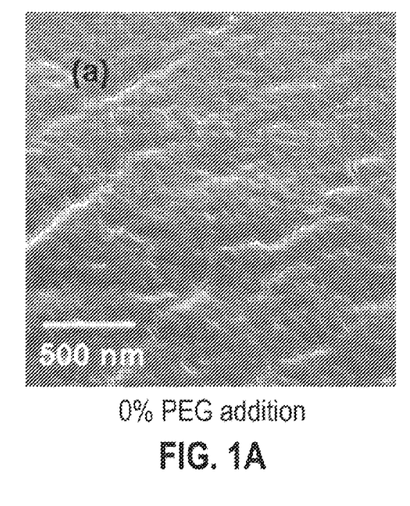
FIG. 1 is a series of cross-sectional SEM images of freestanding films prepared by adding (a) 0%, (b) 30%, and (c) 50% PEG additives into the mixture of methacryl-POSS and PEG-M (weight ratio of POSS:PEG-M=1:20).
Figure 1B:
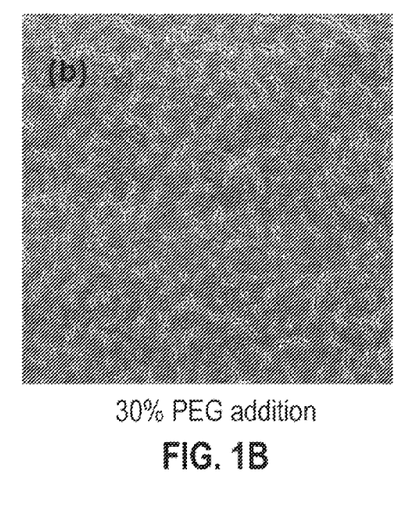
Figure 1C:
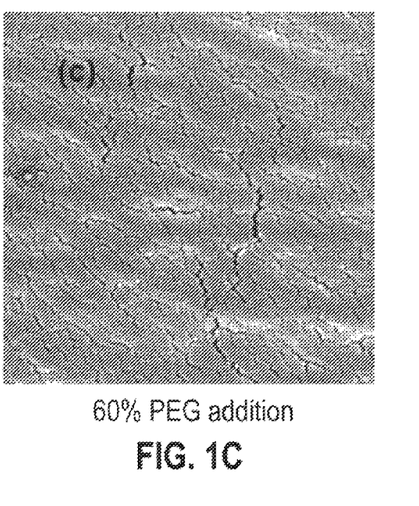

FIGS. 1(a)-(c) show cross-sectional SEM images of free-standing films that were prepared by adding 0%, 30%, and 50% PEG additives into the film-forming composition of methacryl-POSS and PEG-M (weight ratio of POSS:PEG-M=1:20).

Table 1 shows a summary of water uptake, permeability and MWCO (molecular weight cutoff) data measured from channel-formed free-standing films (MWCO is the size designation in Daltons for membranes and it is the molecular weight of the reference polyethylene glycol that is 90% rejected by the membranes).

TABLE 1

| Amount of PEG additive (% (w/w)) | Water uptake (%) | Water Permeability (L μm m$^{-2}$ h$^{-1}$ atm$^{-1}$) | MWCO (kDa) |
|---|---|---|---|
| 0% | 90 | 21.62 | — |
| 10% | 94 | — | — |
| 20% | 139 | 42.79 | 1.4 |
| 30% | 168 | 50.10 | 2.3 |
| 40% | 212 | 77.48 | 2.9 |
| 50% | 276 | 133.22 | 7.4 |

The above data demonstrate that channel density and size increase as the amount of PEG additive increases, and that the water uptake and permeability also strongly depend on the content of PEG additives. Highest water uptake and permeability values (276%, 133 L μm M$^{-2}$ h$^{-1}$ atm$^{-1}$) were observed at the film prepared with 50% (w/w) PEG additive (50% was maximum amount can be added for possible film-handling).

The water uptake and permeability can be further controlled by manipulating the $M_w$ of the PEG additives. The MWCO values (less than 1 kDa~7 kDa) of these channel-formed free-standing films are proper enough to reject organic- or bio-foulants, implying that the films can significantly reduce membrane internal fouling (blocking internal pores of membrane), and the hydrophilic nature of the films proved by high water uptake/permeability indicates that the films will be good to reduce surface fouling of hydrophobic organic- or bio-foulants as well.

Preparation of Composite Membranes and Evaluation of Anti-Fouling Efficiency

As further explained in detail in the working examples below, pre-polymerization mixtures of methacryl-POSS, PEG-M and PEG additives including a photoinitiator were spread on the top surface of polysulfone (PSF) ultra filtration membranes and UV cured. For controlling thickness of the applied coating layer, proper diluents can be added to the pre-polymerization mixtures.

The membranes were then soaked into water to extract water-soluble PEG additive from the films.

Figure 2A:
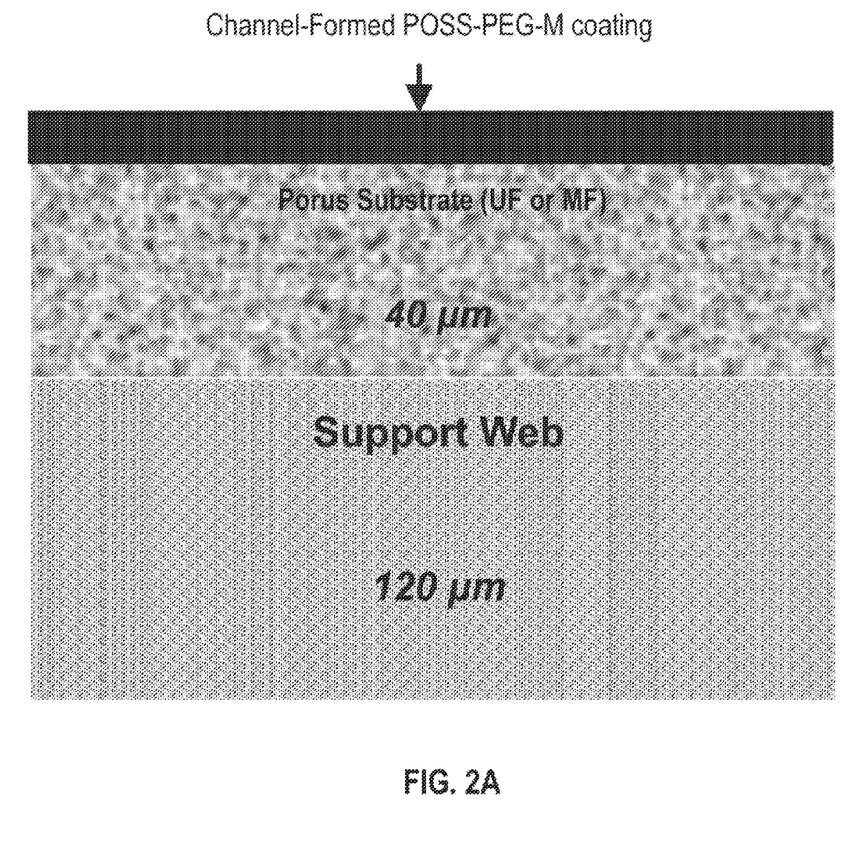

For evaluating anti-fouling efficiency of these channel-formed films, the separation performance of the composite membranes (membrane coated with channel-formed materials, FIG. 2(a)) was compared with the performance of an uncoated polysulfone (PSF) membrane using crossflow filtration system with synthetic feed waters including target foulants such as oils and proteins.

Figure 2B:
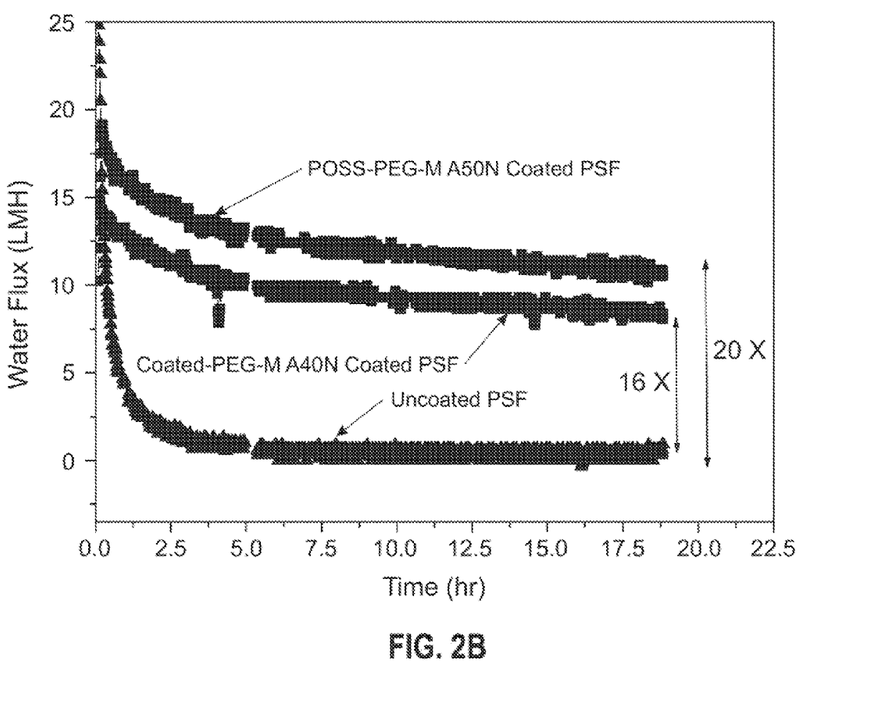

FIG. 2(b) presents the water permeate flux as a function of operation time in oil-water emulsion crossflow filtration. Two composite membranes, where the channel-forming coating layers were prepared by adding 40% and 50% PEG additives into neat pre-polymerization mixtures of methacryl-POSS and PEG-M, were tested. The weight ratio between POSS and comonomer (PEG-M), was fixed to 1:20, and both composite membranes were denoted as POSS-PEG-M A40N and POSS-PEG-M A50N, respectively, in the Figure ('A' refers to PEG additive and 'N' refers to neat pre-polymerization mixture).

The water flux of uncoated PSF membrane dropped significantly within 2 hours, which indicates severe oil fouling. However, both coated membranes exhibited less fouling (almost no flux change after 3 hours) and had much higher flux than the uncoated membranes (16× for film made with 40% PEG additive, POSS-PEG-M A40N, 20× for film made with 50% PEG additive, POSS-PEG-M A50N). The flux difference between the two coated membranes is due to permeability difference of channel-formed materials (high additive loading induces high water permeability).

Thin Film Thickness and Water Flux of Composite Membranes

Figure 3A:
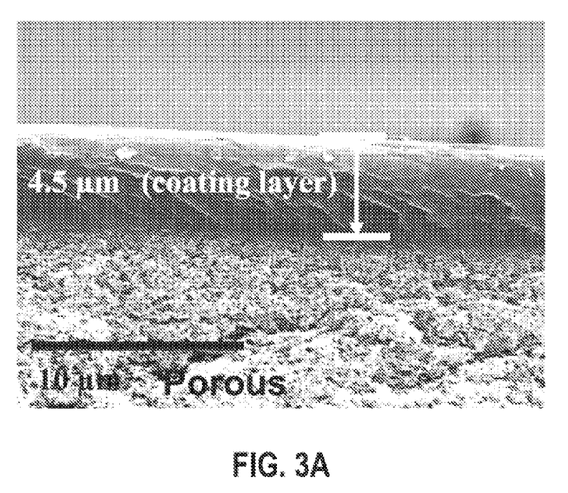

The absolute water flux of coated membranes during filtration can be increased by reducing the thickness of the coating layer. The thickness of the coating layer prepared with 50% PEG additive (POSS-PEG-M A50N) was around 4 μm in the dry state, as shown in FIG. 3 (a).

Figure 3B:
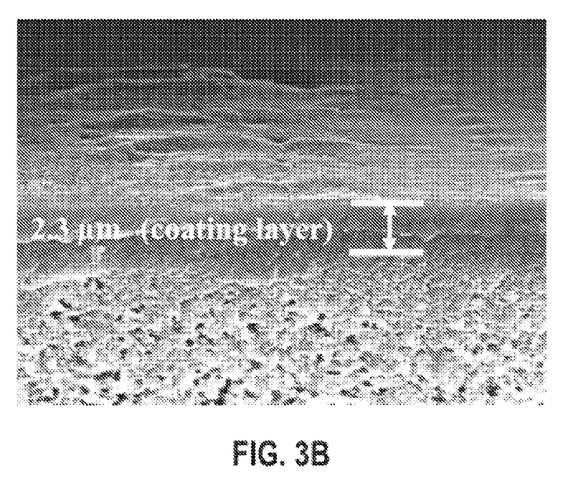

By diluting the pre-polymerization mixture (methacryl-POSS, PEG-M and 50% PEG additive) with 20% (w/w) ethanol (EtOH), the thickness of the coating layer was reduced to 2 μm in the dry state (the coating layer was denoted as POSS-PEG-M A50D in FIG. 3(b); i.e., D refers to diluted pre-polymerization mixture with ethanol).

Figure 4A:
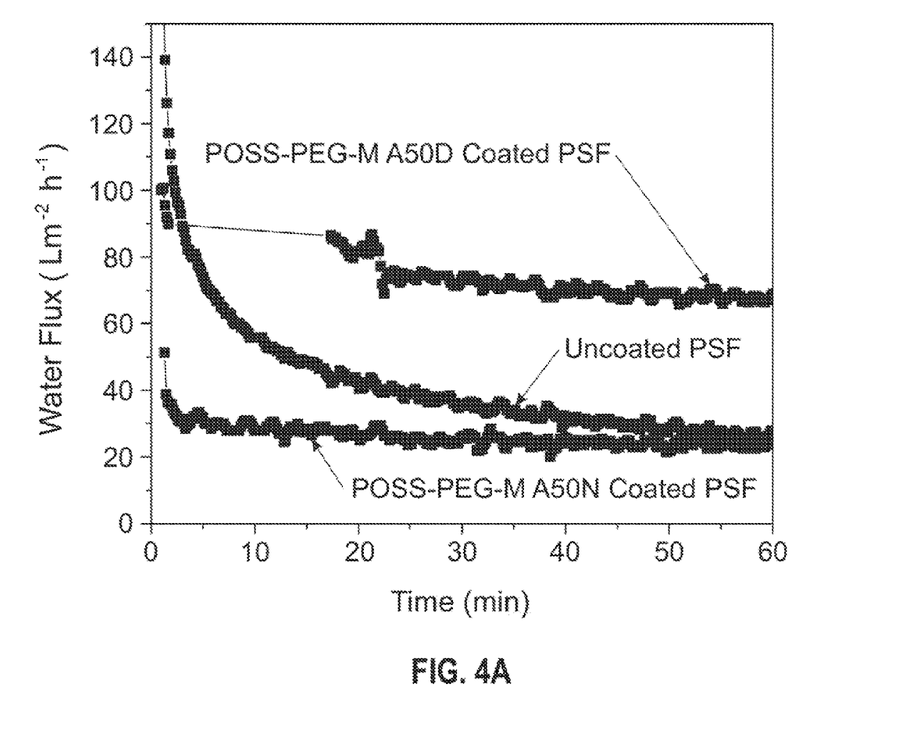

FIG. 4(a) shows bio-fouling resistance of these two composite membranes compared to an uncoated PSF membrane.

The water flux was monitored as a function of operation time in crossflow filtration of protein (Bovine Serum Albumin, BSA) feed solution. Both composite membranes prepared by the neat pre-polymerization mixture (POSS-PEG-M A50N) and by the dilute pre-polymerization mixture (POSS-PEG-M A50D) showed excellent protein-fouling resistance (no flux decline over time), while the uncoated PSF membrane showed a significant flux drop caused by protein fouling.

Figure 4B:
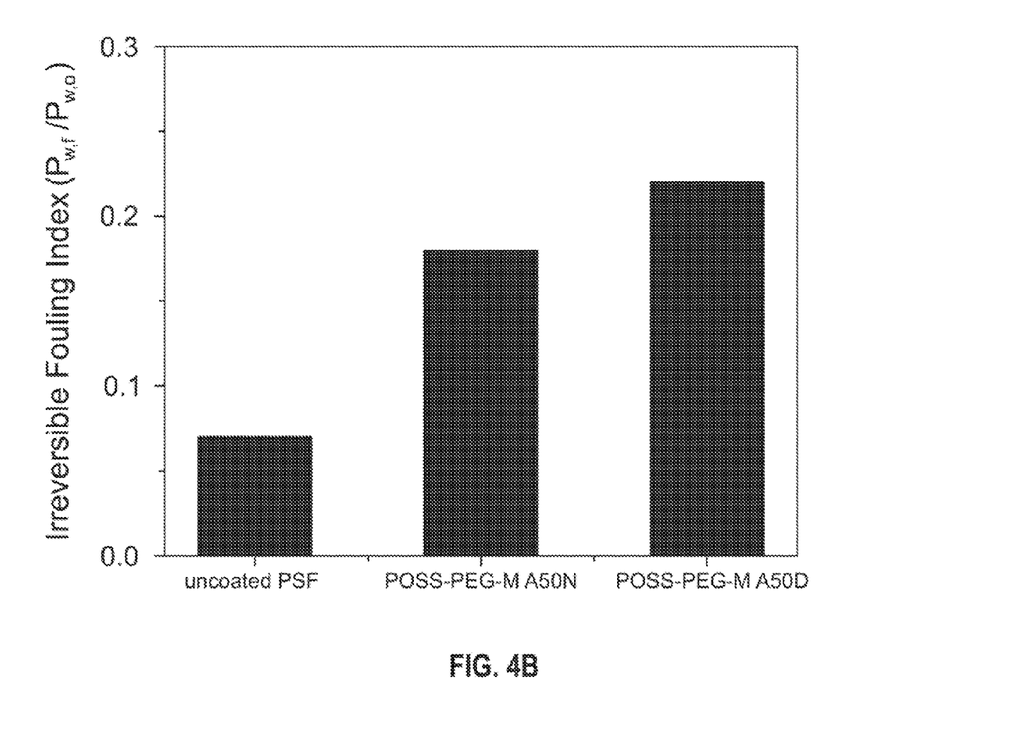
Figure 5:
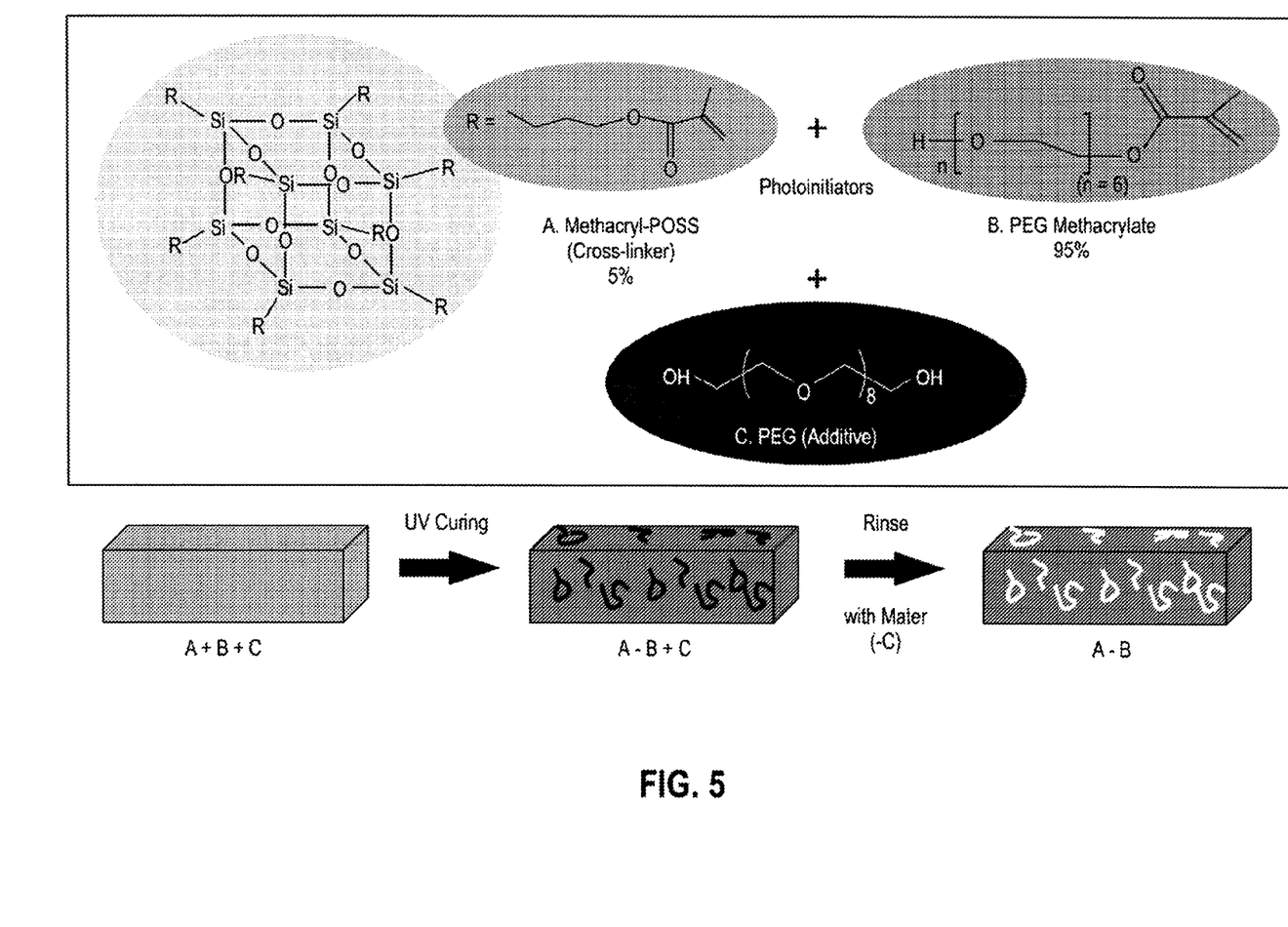
FIG. 5 is a schematic representation of a reaction scheme in which the addition of water-soluble, noncrosslinkable polyethylene glycol (PEG) into a prepolymerization mixture of POSS and PEG-M (weight ratio of POSS: PEG-M=1:20), UV-curing, and subsequent extraction of PEG additive in the water created nano-scale channels within the resulting films.

The absolute water flux of the composite membrane prepared with the dilute pre-polymerization mixture (POSS-PEG-M A50D) was almost 2 times higher than the flux of the composite membrane prepared with the neat pre-polymerization mixture (POSS-PEG-M A50N), because the thickness of the former coating layer is thinner than the thickness of the latter coating layer. Both composite membranes also reduced irreversible fouling compared to the bare PSF membrane, resulting in better flux recovery after fouling experiment (FIG. 4(b)).

The channel-formed hydrophilic coating materials provided additional advantage in protein rejection as well. The composite membranes showed improved rejection ability for the target protein, BSA (more than 95% BSA rejection), compared to the uncoated PSF membrane (0% rejection, MWCO of PSF=100 KDa) due to low MWCO of the coating materials (ca. 7.4 KDa).

Preparatory Examples

Example 1

Channel-formed Film Made by Neat Pre-polymerization Mixture with 40% PEG Additive (POSS-PEG-M A40N)

Free-standing film: 0.29 g of methacryl-POSS (cage mixture 8-12, Hybrid Plastics), 5.71 g of poly(ethylene glycol) methacrylate (Mw: 526, Aldrich), 4 g of polyethylene glycol (Mw: 400) and 0.06 g of initiator (CIBA, Darocur 4265) were mixed in a nitrogen glove box and stirred overnight.

The mixed solution was sandwiched between two quartz plates which are covered with Teflon films and separated by spacer. The solution was then polymerized by exposure to 365-nm UV light for 90 s at 9 mV/cm². The cross-linked films obtained by this process was humidified in the steam bath and immersed in a large amount of deionized water for at least a day.

Water uptake (S) calculated by the weight of dried film ($W_d$) and wet film ($W_s$) was 212% ($S=W_s-W_d/W_d \times 100$). Water permeability measured by stirred ultrafiltration cell at 10 psi was 77.48 L μm M$^{-2}$ h$^{-1}$ atm$^{-1}$. MWCO measured with 0.5% standard polyethylene glycol solutions with molar mass from 200 to 35,000 was 2.9 kDa. These data are summarized in Table 1 above.

Composite film: A PSF support membrane was soaked in the mixed solvents of glycerol and methanol (15% glycerol) to remove any dust on the top surface and dried in air before coating. The prepolymerization mixture was spread on the top surface of dried PSF support membrane using a Gardco automatic drawdown machine with a coating rod (size: 0, coating speed: 2.5 cm/s).

Example 2

Channel-formed Film Made by Neat Pre-polymerization Mixture with 50% PEG Additive (POSS-PEG0-M A50N)

Free-standing film: 0.24 g of methacryl-POSS (cage mixture 8-12, Hybrid Plastics), 4.76 g of poly(ethylene glycol) methacrylate (Mw: 526, Aldrich), 5 g of polyethylene glycol (Mw: 400) and 0.05 g of initiator (CIBA, Darocur 4265) were mixed in the nitrogen glove box and stirred overnight. Preparation and characterization of the film were done in the same manner as Example 1.

Water uptake, permeability and MWCO were 276%, 133.22 L μm$^{-2}$ h$^{-1}$ atm$^{-1}$, and 7.4 kDa, respectively. These data were summarized in Table 1.

Composite film: The preparation procedure is same as shown in Example 1. The thickness of POSS-PEG-M A50N coating layer was 4.5 μm (FIG. 3(a)).

Example 3

Channel-formed Film Made by Dilute Pre-polymerization Mixture with 50% PEG Additive (POSS-PEG-M A50D)

Preparation of pre-polymerization mixture: 0.24 g of methacryl-POSS (cage mixture 8-12, Hybrid Plastics), 4.76 g of poly(ethylene glycol) methacrylate (Mw: 526, Aldrich), 5 g of polyethylene glycol (Mw: 400) and 0.05 g of initiator (CIBA, Darocur 4265) were mixed in the nitrogen glove box, diluted with 2 g of ethanol (EtOH) and stirred overnight.

Composite film: The preparation procedure is same as shown in Example 1. The thickness of POSS-PEG-M A50D coating layer was 2.3 μm (FIG. 3(b)).

Example 4

Evaluation of Anti Fouling Efficiency of Composite Membranes Prepared by POSS-PEG-M A40N and POSS-PEG-M A50N in Oil-water Emulsion Crossflow filtration of oil/water emulsion was carried out to monitor permeate flux of POSS-PEG-M A40N and POSS-PEG-M A50N coated composite membranes using commercial crossflow filtration system. An oil/water emulsion was prepared by blending vegetable oil/surfactant (weight ratio=9:1) with 3 L of deionized water (concentration of oil: 1500 ppm). The crossflow filtration was conducted at 25° C., and the crossflow rate was 0.35 Gal/min at 100 psi. Permeate flux was recorded by digital balances connected to a computer.

POSS-PEG-M A40N and POSS-PEG-M A50N coated composite membranes showed very constant permeate flux for 20 hours (9.5 LMH for POSS-PEG-M A40N and 13.0 LMH for POSS-PEG-M A50N), while uncoated PSF membrane showed severe flux drop after 2 hours (30 LMH to less than 1 LMH). These data were plotted in FIG. 2(b).

Example 5

Evaluation of Bio-fouling Resistance of Composite Membranes Prepared by POSS-PEG-M A50N and POSS-PEG-M A50D Crossflow filtration of protein feed solution was carried out to monitor permeate flux of POSS-PEG-M A50N and POSS-PEG-M A50D coated composite membranes using commercial crossflow filtration system. Protein feed solution was prepared by dissolving 5 g of Bovine Serum Albumin (BSA) in 5 L of deionized water including 0.1 M phosphate buffer (pH 7.4). The crossflow filtration was conducted at 25° C., and the crossflow rate was 0.8 L/min at 30 psi. Permeate flux was recorded by digital balances connected to a computer.

POSS-PEG-M A50N and POSS-PEG-M A50D coated composite membranes showed very constant permeate flux for 60 min (30 LMH for POSS-PEG-M A50N and 75 LMH for POSS-PEG-M A50D), while the uncoated PSF membrane showed severe flux drop after 10 min (160 LMH to less than 40 LMH). These data were plotted in FIG. 4(a).

POSS-PEG-M A50N and POSS-PEG-M A50D coated composite membranes also showed high BSA rejection (95.0% for POSS-PEG-M A50N and 97.5% for POSS-PEG-M A50D), while uncoated PSF membrane showed 0% BSA rejection.

Example 6

Irreversible Bio-fouling Determination (Flux Recovery) on Composite Membranes Prepared by POSS-PEG-M A50N and POSS-PEG-M 50D Irreversible protein fouling is determined by comparing the pure water permeance of composite membranes (coated with POSS-PEG-M A50N and POSS-PEG-M A50D) before and after a fouling experiment. Before a fouling experiment, the pure water flux ($P_{w,o}$) of the membranes was determined at the same pressure and crossflow rate that the fouling experiment took place (at 30 psi and 0.8 L/min).

A fouling experiment was then performed on the membranes with protein feed solution for 60 min as described in Example 4.

After the fouling experiment, the crossflow system was flushed with deionized water at least three times, after which water was allowed to circulate through the system for total 30 min for rinsing. The post-fouling pure water flux ($P_{w,f}$) was recorded after the rinsing cycle. Water flux recovery index was then calculated by dividing $P_{w,f}$ by $P_{w,o}$.

Composite membranes coated by POSS-PEG-M A50N and POSS-PEG-M A50D showed higher flux recovery index (0.18 and 0.22, respectively) compared to uncoated PSF membrane (0.07), indicating that the coating materials reduce irreversible bio-fouling on the membrane surface. These data were plotted in FIG. 4(b).

Example 7

Protein Adhesion Experiment on Composite Membranes Prepared by POSS-PEG-M A50N and POSS-PEG-M A50D Protein adhesion experiments were performed using a fluorimetric assay of tagged Bovine Serum Albumin (BSA). 2.5 cm (1 in.) diameter samples were cut from flat-sheet composite membranes prepared by POSS-PEG-M A50N and POSS-PEG-M A50D. The circular samples were placed in dead-end cells (Advantec MFS, #UHP 25, Dublin, Calif., USA) having an effective surface area of 3.5 cm² and washed several times with deionized water. R—NHS-tagged BSA solution (0.1 mg/mL in deionized water) was then added to the cells. After 10 min, the protein solutions were decanted and the membrane surface was washed repeatedly with deionized water.

The membranes were then air dried and tested for fluorescent intensity using either a fluorescent microscope (Leica DM IRBE, Bannockburn, Ill., USA) or a plate reader (Tecan Sapphire II, Mannedorf, Switzerland). The fluorescence intensity measured on the composite membranes was normalized by the intensity measured on bare PSF membrane. The normalized fluorescence intensity values of the composite membranes prepared by POSS-PEG-M A50N and POSS-PEG-M A50D were 0.24 and 0.38, respectively (less than 1). This result indicates that the coating materials are much more resistant to protein adhesion compared to a bare PSF ultrafiltration membrane.

Various embodiments of the invention have been described. These and other embodiments are within the scope of the following claims.

The invention claimed is:

1. A composite membrane comprising a filtration membrane and a layer on a surface of the filtration membrane, wherein the layer comprises a polymer comprising a polyhedral oligomeric silsesquioxane (POSS) derivative with a hydrophilic moiety attached to at least one vertex thereof, wherein the hydrophilic moiety is derived from at a compound selected from the group consisting of poly(ethylene glycol) acrylate, poly(ethylene glycol)diacrylate, poly(ethylene glycol)methacrylate, acrylic acid, 2-hydroxyethyl methacrylate, 2-hydroxyethyl acrylate, 2-(2-ethoxyethoxy)ethyl acrylate, tetrahydrofurfuryl acrylate, and combinations thereof.

2. The composite membrane of claim 1, wherein the compound is selected from the group consisting of poly(ethylene glycol)acrylate, poly(ethylene glycol)methacrylate and combinations thereof.

3. The composite membrane of claim 1, wherein the POSS compound has at least 8 vertices.

4. The composite membrane of claim 1, wherein the layer comprises at least one of pores and channels with a MWCO of about 0.5 to about 10 kDa, wherein the MWCO is the molecular weight of a reference polyethylene glycol that is 90% rejected by the membrane.

5. The composite membrane of claim 4, wherein said at least one of pores and channels have a MWCO of about 1.5 to about 7.5 kDa.

6. The composite membrane of claim 1, wherein the layer has a dry thickness of about 50 nm to about 5 μm.

7. A method for making a composite membrane, comprising:
    applying to a surface of a filtration membrane a photopolymerizable composition comprising a POSS compound, a hydrophilic comonomer, and a photoinitiator, wherein the comonomer comprises at least one of poly (ethylene glycol)acrylate, poly(ethylene glycol)diacrylate, poly(ethylene glycol)methacrylate, acrylic acid, 2-hydroxyethyl methacrylate, 2-hydroxyethyl acrylate, 2-(2-ethoxyethoxy)ethyl acrylate, or tetrahydrofurfuryl acrylate; and
    curing the composition to form a hydrophilic layer on the filtration membrane.

8. The method of claim 7, wherein the POSS compound comprises one or more polyhedral silsesquioxane structures each having one or more polymerizable groups, wherein the polymerizable groups are bound to respective silicon atoms of the polyhedral silsesquioxane structures.

9. The method of claim 8, wherein the one or more polymerizable groups comprise the structure -$(L)_n$-P, where L is a linking group, n is 0 or 1, and P is a polymerizable group.

10. The method of claim 9, wherein the linking group is independently selected from the group consisting of alkyl groups, cycloalkyl groups, siloxanes, alkysilyl groups, alkylsiloxyl groups and combinations thereof.

11. The method of claim 9, wherein said one or more polymerizable groups are independently selected from (meth)acrylates.

12. The method of claim 11, wherein the selected (meth) acrylate is at least one of the following methacrylates:

13. The method of claim 11, wherein the selected (meth) acrylate is an acrylate comprising:

14. The method of claim 11, wherein the polymerizable group is:

15. The method of claim 7, wherein the comonomer is PEG (meth)acrylate.

16. The method of claim 7, wherein the photopolymerizable composition further comprises a solvent-extractable sacrificial compound, and wherein the method further comprises:
polymerizing the photopolymerizable composition to form a thin film on the surface of the filtration membrane; and
applying a solvent to the thin film to extract the solvent-extractable sacrificial compound and create at least one of pores and channels in the thin film.

17. The method of claim 16, wherein the solvent comprises water, and the sacrificial compound is selected from the group consisting of polyethylene glycol, polyacrylic acid, hydroxyethyl cellulose, and combinations thereof 18. The method of claim 17, wherein the thin film comprises at least one of pores and channels with a MWCO of about 1 to about 10 kDa, wherein the MWCO is the molecular weight of a reference polyethylene glycol that is 90% rejected by the membrane.

19. The method of claim 7, wherein the composition further comprises a diluent.

* * * * *